US006482499B1

(12) United States Patent
Evers

(10) Patent No.: US 6,482,499 B1

(45) Date of Patent: Nov. 19, 2002

(54) PLATE-SHAPED SAFETY COMPONENT

(75) Inventor: Heinz Evers, Buchkirchen (AT)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 09/552,061

(22) Filed: Apr. 19, 2000

(30) Foreign Application Priority Data

Apr. 21, 1999 (AT) ............................................... 704/99

(51) Int. Cl.[7] .................................................. B32B 3/12

(52) U.S. Cl. ....................... 428/116; 428/178; 296/189; 296/191; 296/202; 296/207

(58) Field of Search ................................ 428/116, 117, 428/118, 174, 178, 179, 180, 73, 72; 296/187, 189, 191, 202, 207

(56) References Cited

U.S. PATENT DOCUMENTS 3,130,819 A 4/1964 Marshall ........................ 188/1
3,857,595 A * 12/1974 Plegat
4,413,856 A * 11/1983 McMahan et al.
5,542,738 A 8/1996 Walker et al. .............. 296/189
5,683,781 A * 11/1997 Komarek et al.
6,331,028 B1 * 12/2001 O'Neill et al.

FOREIGN PATENT DOCUMENTS

| | | | |
|---|---|---|---|
| DE | 43 37 314 A1 | 5/1995 | ........... B62D/25/02 |
| FR | 2 702 432 | 9/1994 | ........... B60R/19/03 |
| FR | 2 761 434 | 10/1998 | ............. F16F/7/12 |

* cited by examiner

*Primary Examiner*—Deborah Jones
*Assistant Examiner*—Wendy Boss
(74) *Attorney, Agent, or Firm*—Shapiro & Dupont LLP

(57) ABSTRACT

A plate-shaped safety-component made of a composite material is equipped with support elements in opposite end regions of said component for anchoring to a supporting structure. To achieve an anchoring which allows for deformation of extension under an applied force, said support elements have bearing members made of honeycomb material disposed in at least one end region, are pressure loaded as a result of said anchoring forces (K), and in which the axial direction (T) of the honeycomb is aligned to the respective direction (R) of the anchoring force.

25 Claims, 2 Drawing Sheets

P 10 4 5 6 1 3 2 A 5 6 F 4 10 11 J 11 M 10
4
F
6
5
M
11
A
J
P
2
3
1
11
6
5
4
10

10
9
63
6
7
62
7
61
5
8
1
K
11
K
12
R
M
s
$c_1$
$b_1$
$a_1$
T $c_1$
$b_1$
$a_2$
5
1
s
$a_1-a_2$
K
11
K
12
M
10
R
9
6
63
7
62
7
61
8
T $b_1-b_2$
$c_1-c_2$
$c_2$
$b_2$
$a_2$
5
1
s
$a_1-a_2$
K
11
K
8
10
R
M
9
7
6
63
62
7
61
8

PLATE-SHAPED SAFETY COMPONENT

BACKGROUND OF THE INVENTION

1. Field of the Invention

The present invention relates to a plate-shaped safety component made of a composite material with support elements disposed in opposite end regions of the component for anchoring it to a supporting structure.

2. Description of Related Art

Passive safety components of this type are used primarily in the manufacture of automobiles for protecting against collision. When acted upon by a force, such components also undergo a specific deformation in extension to absorb the requisite amount of energy, which force-path conditions are subject to specific manufacturing standards. Safety components made of composite materials which generally consist of a core material, preferably polyurethane-hard foam encased by a layer composed of a fiber-resin-matrix, preferably epoxy- or PUR-resin combined with carbon-, glass or aramide fibers, are as a rule clearly superior to a comparable component made of metal with regard to rigidity versus weight. However, problems have resulted heretofore due to a lack of flexibility of the materials being used. Given a composite material of suitable design, such material can normally easily absorb the amount of force required to comply with applicable safety standards and to achieve the requisite amount of flexure, yet, when a force is applied, the requisite deformation of extension remains insufficient. Hence, even composite components having such characteristics fail to achieve the desired compatibility with predominantly metal materials used in automobile manufacturing, such as steel or aluminum.

Tests have shown that the attachment of the safety component to the vehicle body or to another supporting structure, and hence the actual force path, represents the weak point in the overall design, in which known support elements used for anchoring, so-called inserts made of fiber-reinforced plastic or aluminum, are intended to form a high-strength connection to the supporting structure, and it is this high-strength connection which causes the component as a whole to fail. The obvious step of reinforcing this connection to the vehicle body is untenable, however, since such reinforcing would mean further reinforcing the vehicle design, thus making the vehicle correspondingly heavier and stiffer.

Thus, the object of the present invention is to provide a plate-shaped safety component of the aforementioned kind which is distinguished by a novel anchoring concept and which allows for the requisite deformation in extension when acted upon by a force.

SUMMARY OF THE INVENTION

The object of the invention is achieved by the use of support elements that include bearing members made of a honeycomb material which are disposed in at least one end region, are pressure loaded as a result of the anchoring forces, and the honeycomb axes which are aligned in the respective direction of anchoring force. By utilizing bearing members made of a honeycomb material for anchoring and aligning said honeycomb material in the direction of the anchoring force, the honeycomb material is compressed when appropriately pressure loaded. This produces a deformation in extension wherein the connection between the safety component and the supporting structure remains intact. Thus, as the bearing members are crushed, a deformation in extension necessary for the requisite force-path-ratio of the safety component is achieved. It is possible, e.g. for purposes of changing specific design standards, to modify the compressive force that acts upon the bearing members as well as related deformation changes by altering various parameters during manufacture of the bearing members, e.g. the height and thickness of the honeycomb material, the sheet material used in the honeycomb, and the like. Honeycombs are ideally suited for absorbing energy in a controlled, uniform manner and they are non-resilient. They ensure a desirable connection between a safety component and the supporting structure; moreover, such a connection is also adaptable to varying conditions.

Fuller control of the anchoring connection is made possible by using bearing members which consist of at least two honeycomb sections separated from one another by an interstitial layer and inserted between two outer facing surface layers, and in which a step-by-step deformation in extension is caused by the anchoring force as a function of the inserted honeycomb sections. It is necessary for the force to impact the bearing members at a planar angle in order to achieve optimum effect and to ensure that the individual honeycomb sections are compressed in a uniform manner.

It is not necessary to anchor every safety component to a rigid supporting structure, such as a vehicle body; rather it is also feasible to tether one or more safety components to one another in order to provide all-around protection to a vehicle or the like. In such case, the individual safety components are chain-linked together and may be mounted around the front and sides of the vehicle, thus providing protection especially against a frontal impact.

BRIEF DESCRIPTION OF THE DRAWINGS

The present invention is schematically illustrated in the drawing below, in which.

DETAILED DESCRIPTION THE INVENTION

Figure 1:
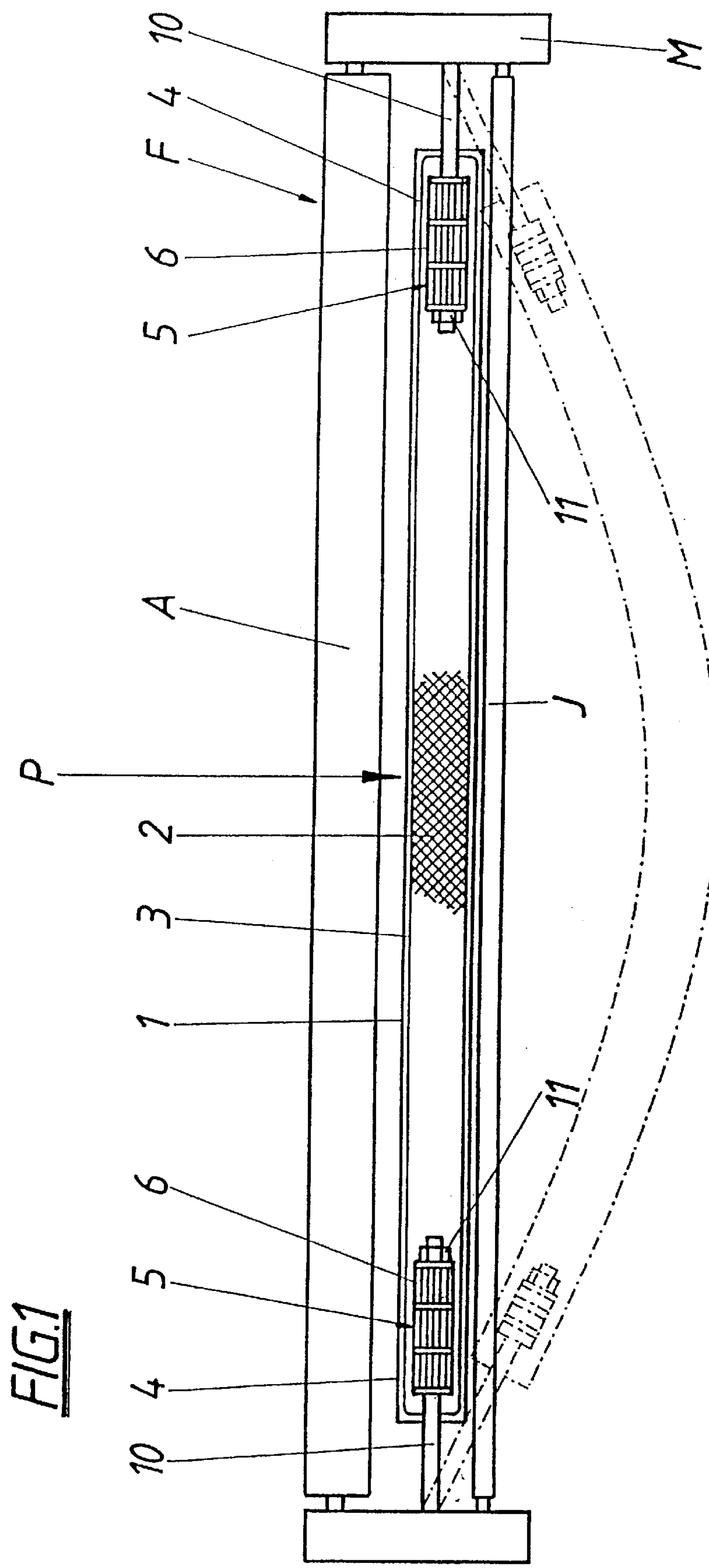
FIG. 1 is a plan view of the safety component according to the present invention which has been incorporated in a vehicle door design.
Figure 2:
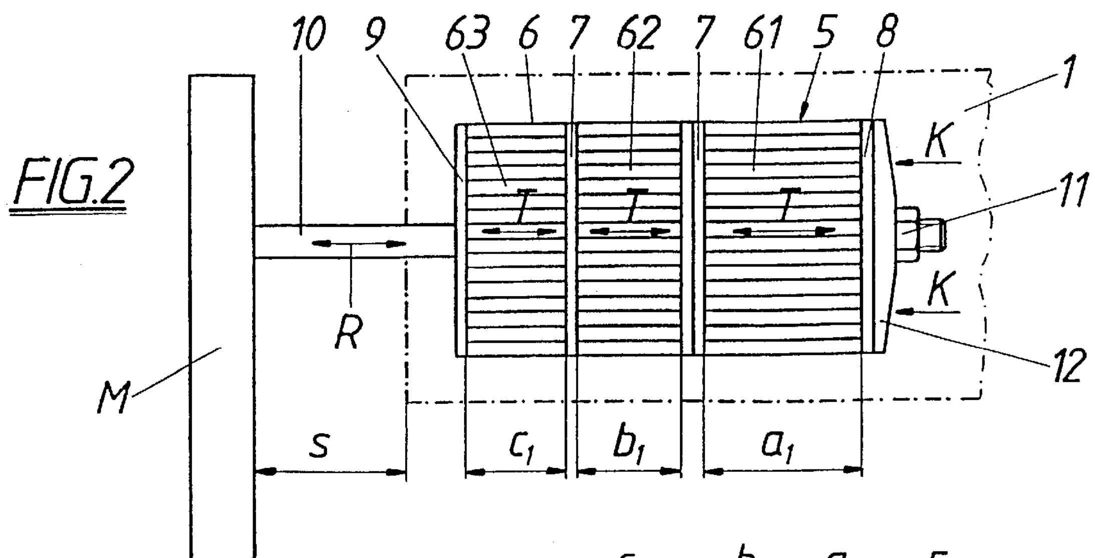
FIGS. 2, 3 and 4 are lateral views, respectively, of a support element of said safety component shown in three different load states.
Figure 3:
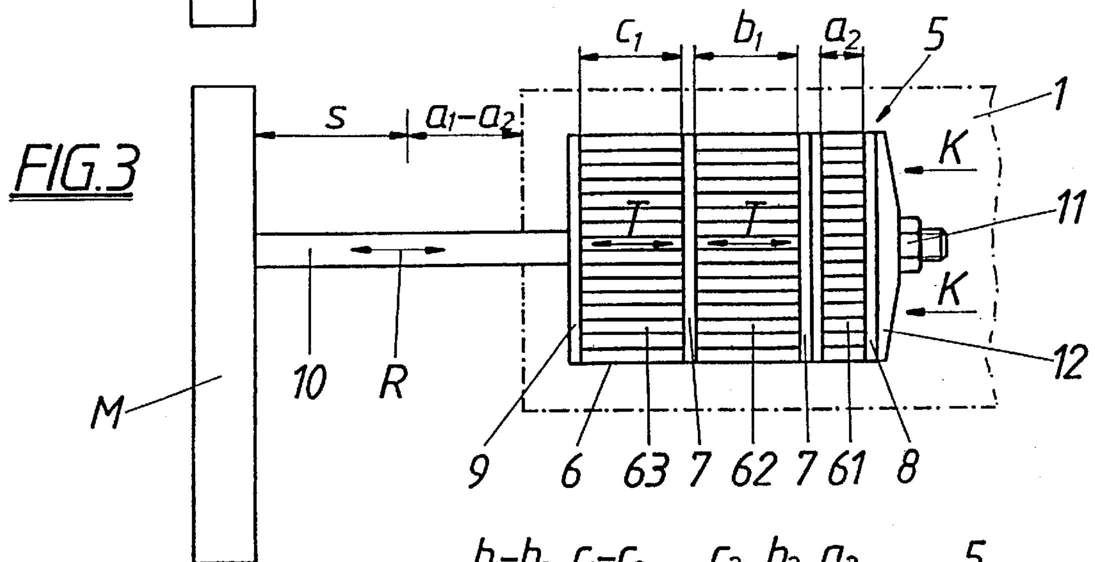
Figure 4:
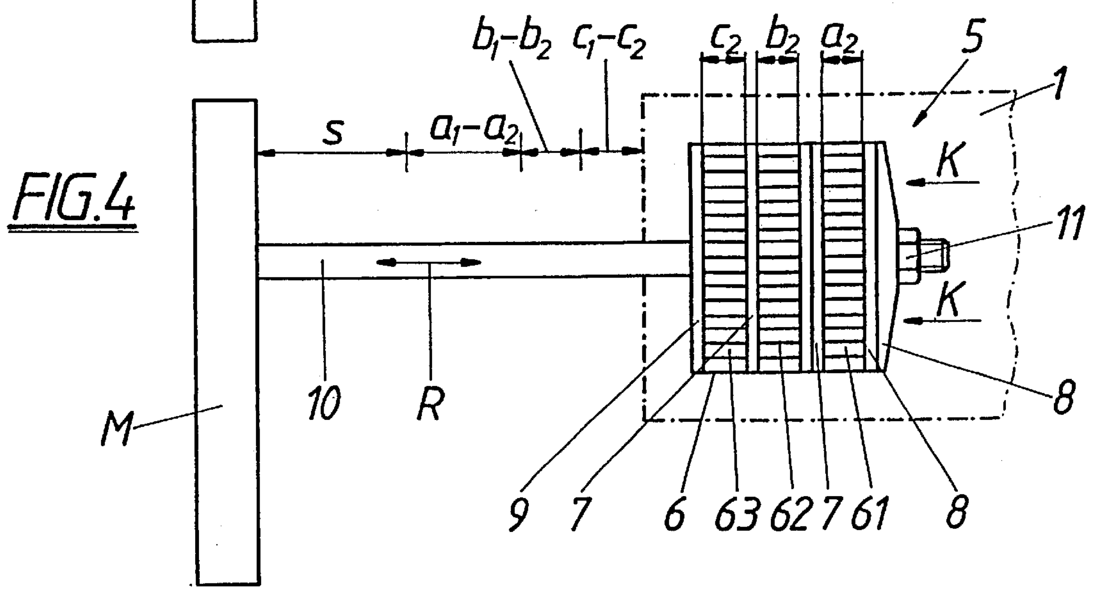

A plate-shaped safety component 1 made of a composite material comprising a polyurethane hard foam core 2 and a fiber-reinforced epoxy-resin casing 3 is installed as a passive protective element in a vehicle door F having a metal frame M, an outer panel A and an inner panel J, and which is equipped with support elements 5 disposed in lateral, opposite component end regions 4 for anchoring said safety component 1 to the metal frame M of the supporting structure. Said support elements are comprised of bearing members 6, each consisting of three honeycomb sections 61, 62, 63, separated from one another by interstitial layers 7, and inserted between outer facing surface layers 8 and 9. A threaded spindle 10 extends through bearing members 6 and is anchored to frame M. Said spindle is supported by a terminal thread 11 and a pressure plate 12 on the inside of support element 5 for applying a uniform, holohedral pressure to the bearing member end surfaces. The axial direction T of the honeycombs of sections 61, 62, 63 of bearing members 6 is aligned with the direction R of the anchoring force defined by threaded spindle 10, such that anchoring force K impacts the honeycomb material of bearing members 6 as a compressive force in the axial direction of the honeycombs. length a1 are compressed, and the collapse of said honeycomb sections 61 to a length a2 produces a deformation in extension (a1-a2) of the flexing safety component (FIG. 3). If said anchoring force exceeds a second critical value, the second sections 62 of honeycomb material of a length b1 are compressed and this collapse to a length b2 produces a further deformation in extension (b1-b2) of said safety component 1. Finally, if said anchoring force reaches a third critical value, and third sections 63 of honeycomb material of a length c1 are compressed to a length c2, and said safety component 1 again undergoes deformation of extension (c2-c1), such that with a load generated by force P with simultaneous flexure, an overall deformation of extension (a1-a2)+(b1-b2)+(c1-c2) is produced (FIGS. 1 and 4). This allows safety component 1 to absorb the energy it requires from force P and the deformation of extension to fulfill its protective function.

To control the force-path ratio, it is feasible to manufacture bearing members using various honeycomb materials. Said bearing members may be composed of honeycomb material of varying lengths and they may be fitted with interstitial and surface layers of varying thicknesses. Further, it is feasible to vary the number and arrangement of bearing members themselves.

What is claimed is:

1. A safety component for absorbing energy from an impact force wherein said impact force has an impact direction, said safety component comprising:

a protective element having an impact face for receiving said impact force and at least one anchoring site that is anchorable to a mounting structure, said anchoring site being movable in a direction that is transverse to said impact direction when said impact face is displaced due to said impact force; and a support element for anchoring said protective element at said anchoring site to said mounting structure, said support element comprising at least one honeycomb section, said honeycomb section comprising a honeycomb having an axial direction, said honeycomb being crushable in said axial direction when said anchoring site moves in said transverse direction when said impact face is displaced due to said impact force, said crushing of said honeycomb in said axial direction providing for absorption of energy from said impact force.

2. A safety component according to claim 1, wherein said support element comprises at least two honeycomb sections wherein each of said honeycomb sections comprises a honeycomb having an axial direction.

3. A safety component according to claim 2 wherein the impact force required to crush each of said honeycomb sections is different.

4. A safety component according to claim 1 wherein said protective element is in the shape of a plate.

5. A safety component according to claim 4 wherein said plate comprises a core that is surrounded by a fiber-reinforced resin casing.

6. A safety component according to claim 5 wherein said core comprises a foam.

7. A safety component according to claim 3 wherein said support elements comprises three honeycomb sections.

8. A vehicle door for absorbing energy from an impact force wherein said impact force has an impact direction, said vehicle door comprising:

a) a frame comprising at least one mounting structure;

b) an outer panel attached to said frame, said outer panel being movable in said impact direction when subjected to said impact force;

c) an inner panel attached to said frame; and d) a safety component located between said outer panel and said inner panel, said safety component comprising:

a protective element having an impact face for receiving said impact force and at least one anchoring site that is anchorable to said mounting structure, said anchoring site being movable in a direction that is transverse to said impact direction when said impact face is displaced due to said impact force; and a support element for anchoring said protective element at said anchoring site to said mounting structure, said support element comprising at least one honeycomb section, said honeycomb section comprising a honeycomb having an axial direction, said honeycomb being crushable in said axial direction when said anchoring site moves in said transverse direction when said impact face is displaced due to said impact force, said crushing of said honeycomb in said axial direction providing for absorption of energy from said impact force.

9. A vehicle door according to claim 8 wherein said support element comprises at least two honeycomb sections wherein each of said honeycomb sections comprises a honeycomb having an axial direction.

10. A vehicle door according to claim 9 wherein the impact force required to crush each of said honeycomb sections is different.

11. A vehicle door according to claim 10 wherein said protective element is in the shape of a plate.

12. A vehicle door according to claim 11 wherein said plate comprises a core that is surrounded by a fiber-reinforced resin casing.

13. A vehicle door according to claim 12 wherein said core comprises a foam.

14. A vehicle door according to claim 10 wherein said support element comprises three honeycomb sections.

15. A method for absorbing energy from an impact force where said impact force has an impact direction, said method comprising the steps of:

a) providing a safety component comprising:

a protective element having an impact face for receiving said impact force and at least one anchoring site that is anchored to a mounting structure, said anchoring site being movable relative to said mounting structure in a direction that is transverse to said impact direction when said impact face is displaced due to said impact force;

a support element for anchoring said protective element at said anchoring site to said mounting structure, said support element comprising at least one honeycomb section, said honeycomb section comprising a honeycomb having an axial direction, said honeycomb being crushable in said axial direction when said anchoring site moves in said transverse direction when said impact face is displaced due to said impact force, said crushing of said honeycomb in said axial direction providing for absorption of energy from said impact force.

16. A method for absorbing energy according to claim 15 wherein said support element comprises at least two honeycomb sections wherein each of said honeycomb sections comprises a honeycomb having an axial direction.

17. A method for absorbing energy according to claim 16 wherein the impact force required to crush each of said honeycomb sections is different.

18. A method for absorbing energy according to claim 15 wherein said protective element is in the shape of a plate.

19. A method for absorbing energy according to claim 18 wherein said protective element is located in a vehicle door.

20. A method for absorbing energy according to claim 18 wherein said plate comprises a core that is surrounded by a fiber-reinforced resin casing.

21. A method for absorbing energy according to claim 20 wherein said core comprises a foam.

22. A method for absorbing energy according to claim 16 wherein said support element comprises three honeycomb sections.

23. A safety component according to claim 3 wherein each of said honeycomb sections has an axial length and wherein the axial length of each of said honeycomb sections is different.

24. A vehicle according to claim 10 wherein each of said honeycomb sections has an axial length and wherein the axial length of each of said honeycomb sections is different.

25. A method for absorbing energy according to claim 17 wherein each of said honeycomb sections has an axial length and wherein the axial length of each of said honeycomb sections is different.

* * * * *